Dec. 14, 1965   D. W. WANER   3,223,201
BRAKE FOR A PUSH-PULL CONTROL CABLE
Filed May 4, 1964   2 Sheets-Sheet 1

INVENTOR.
DONALD W. WANER
BY Hamilton & Cook
ATTORNEYS

INVENTOR.
DONALD W. WANER
BY Hamilton & Cook

ATTORNEYS

United States Patent Office 3,223,201
Patented Dec. 14, 1965

1

3,223,201
BRAKE FOR A PUSH-PULL CONTROL CABLE
Donald W. Waner, Cuyahoga Falls, Ohio, assignor to
The Morse Instrument Co., Hudson, Ohio, a corporation of Ohio
Filed May 4, 1964, Ser. No. 364,737
4 Claims. (Cl. 188—67)

The present invention relates generally to push-pull control cables. More particularly, the present invention relates to control cables having flexible casings adapted to receive a flexible core reciprocably therein for transmitting mechanical motion. Specifically, the present invention relates to a braking device for applying controlled resistance to the movement of a cable core in the control casing.

Although the prior art knows many constructions for push-pull control cables, one of the most suitable constructions utilizes a casing which comprises a plurality of wires laid contiguously in a long pitched helix. This construction contributes greatly to flexibility and efficiency of the cable.

The helically arranged wires are maintained in their proper position solely by a plastic cover in smaller cables and by a reinforcing spread helix of wire or flat metallic ribbon, in conjunction with a plastic cover, in larger cables.

Such cables preferably include a plastic tube as the innermost element which acts as a bearing for the core which is slidable therein and also acts to protect the casing wires from the elements having access to the interior of the tube. The plastic cover which comprises the outermost element of the cable similarly acts as a protective member to shelter the wires from the exterior elements.

Control cables having casings constructed of long pitched helically wound wires are particularly efficient because such a cable has been found to permit extreme bending on even a short radius of curvature without causing any marked change in the annular axial passage interiorly of the casing. Thus, the core is slidable therein with the least possible resistance, even when the control cable includes a series of bends between the control station and the remote controlled station.

Push-pull control cables are employed in a variety of situations. Some situations require the absolute minimum of operating resistance between the control and controlled stations. For example, when a push-pull cable is installed to operate a high load transmission, little or no resistance is desired since resistance would result in an increase of the necessary operating load at the control station.

Another typical installation would be for the operation of a spring loaded throttle the setting of which cannot be maintained without a counter force sufficient to oppose the spring. The relatively frictionless movement of the cable core in a casing of the construction described above can not of itself maintain such a throttle at the desired setting.

Numerous other installations will come to the mind of those skilled in the art where selectively variable resistance to the movement of the core in the casing of the push-pull cable is desired.

It is therefore the primary object of the present invention to provide a brake device for selectively controlling the sliding resistance of a cable core within its casing.

2

It is another object of the present invention to provide a brake device, as above, which can lock the cable core in selected axial position with respect to the cable casing.

It is yet another object of the present invention to provide a brake device, as above, which can be operatively applied to the exterior of a cable casing at any place along the axial extent thereof.

It is a further object of the present invention to provide a brake device, as above, which is selectively operative to control the frictional resistance to the sliding of the cable core through a casing formed of long pitched helically wound wires without deforming the wires or otherwise injuring the cable.

It is a still further object of the present invention to provide a brake device, as above, which is readily adaptable to a variety of cable sizes and which is uncomplicated and inexpensive to manufacture and install.

These and other objects of the invention, and further advantages thereof, will become apparent from the following specification and are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

Figure 1:
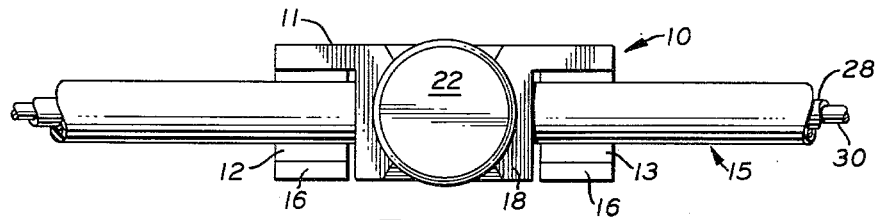
FIG. 1 is a top plan view of a brake device constructed in accordance with the concept of the present invention operatively positioned on a push-pull control cable to permit free reciprocation of the core in the casing.

In general, a brake device constructed according to the concept of the present invention has a pair of laterally spaced receiving tines forming a split anvil which is hooked to retain a control cable casing thereacross. Oriented transversely and medially of the anvil tines in opposed, spaced relation is a depressor means operated by a screw driven plunger which is positionable in selective spaced relation to said anvil.

Referring more particularly to the drawings, the subject brake device is indicated generally by the numeral 10. The brake 10 has a body portion 11 outwardly of which extend two laterally spaced tines 12 and 13 which form a split anvil portion 14. The tines are hooked to provide means for retaining a push-pull control cable 15 thereacross. Satisfactory hooking of the tines may be accomplished any number of ways, such as forming them in arcuate outward and upward profile or, as shown, by providing upwardly directed calks 16 on the outer ends of each of the substantially straight tines 12 and 13.

Figure 2:
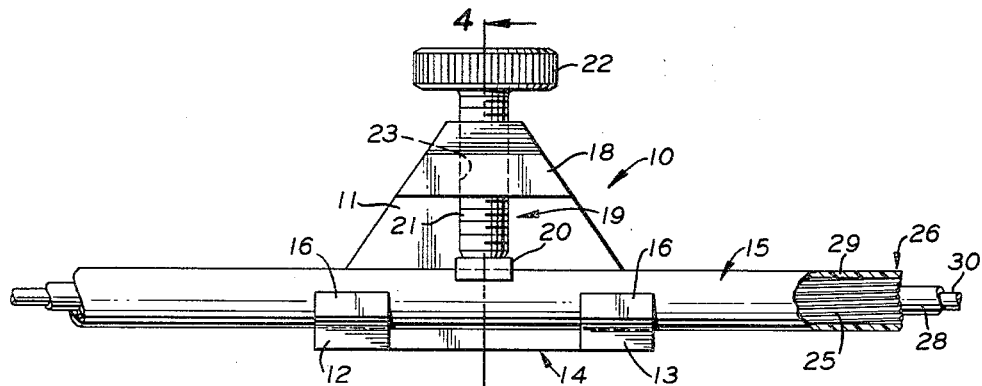
FIG. 2 is a side elevation of the brake device shown in FIG. 1.
Figure 3:
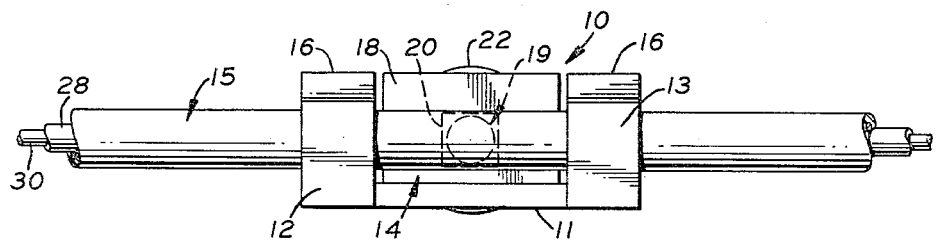
FIG. 3 is a bottom plan of the brake device shown in FIGS. 1 and 2.
Figure 4:
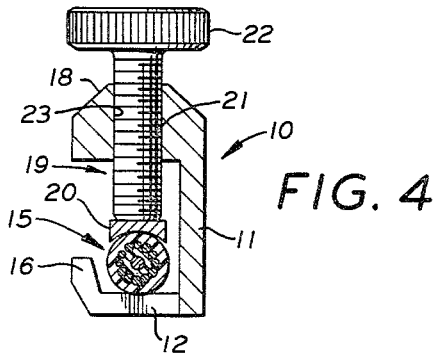
FIG. 4 is a cross section taken substantially on lines 4—4 of FIG. 2.
Figure 5:
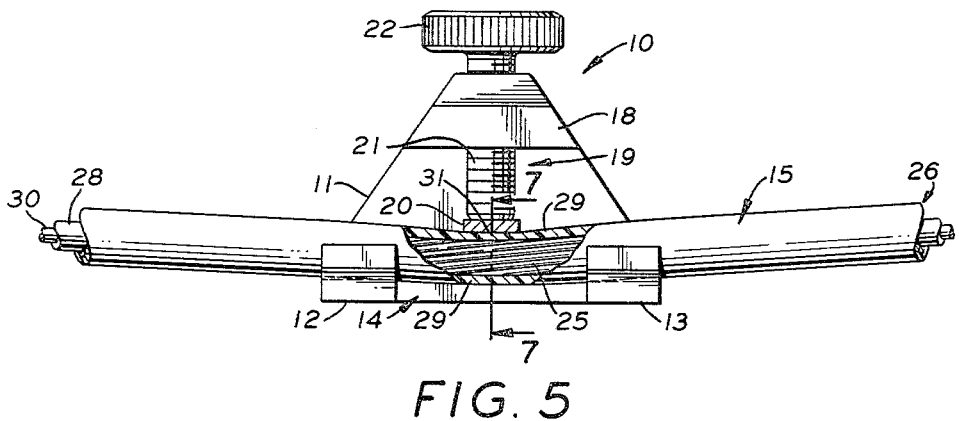
FIG. 5 is a side elevation similar to FIG. 2 showing the brake device operatively positioned on a push-pull control cable to restrict the reciprocation of the core in the casing.

Also extending outwardly from the body portion 11 is a support beam 18 spaced upwardly of the anvil 14. A plunger 19 having a vertically positionable depressor 20 at the base of the threaded shank 21 and an operating knob 22 at the opposite end of shank 21 is received in the bore 23 through support beam 18 and oriented transversely and medially of the anvil tines 12 and 13, as best shown in FIGS. 2 and 5. The bore 23 is also threaded and cooperates with the threaded shank 21 to position the depressor 20 in selective spaced relation above the anvil. As shown, the depressor may be in the form of a saddle having a U-shaped cross section, although for some installations a rounded nose on the lower end of shank 21 has been found to be quite satisfactory.

Figure 6:
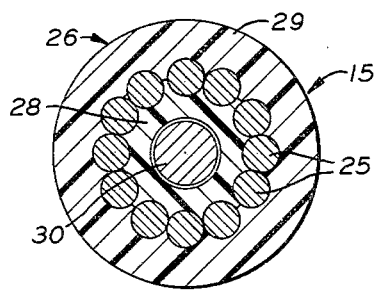
FIG. 6 is an enlarged area of FIG. 4 showing the cross section of the control cable in which the core is freely reciprocable; and, FIG. 7 is an enlarged cross section similar to FIG. 6 taken substantially on line 7—7 of FIG. 5 and depicting the cross section of a control cable in which the movement of the core is restricted.

The push-pull cable 15 with which the brake 10 is shown utilizes wires 25 in the cable casing 26 which are preferably oil tempered, carbon steel, dead-straight spring wires laid in substantially side-by-side contact to form a cylindrical grouping around the radial outer surface of a flexible, resinous inner tube 28 (see FIG. 6).

Wires 25 are laid around the tube 28 in a fairly long pitched helix and are themselves encased in a plastic cover 29.

The details of such a push-pull cable and the method for making the same can be found in my copending U.S. patent application, Serial No. 227,889, filed on October 2, 1962.

Such a push-pull cable 15 is extremely flexible and efficient. That is, the cable 15 can be bent around a very short radius without disturbing the cylindrical grouping of the wires 25. This permits the core 30 to be reciprocated within the inner tube 28 without hindrance and comprises the high efficiency of the cable.

However, the applicant has found that if the cable is bent on a very short radius, and if the arc of this radius is restricted, the cylindrical grouping of the wires 25 tends to become elliptic without causing any "set" or other damage, to the wires so that when the restricted, short radius arc is removed the wires immediately return to their cylindrical grouping.

Figure 7:
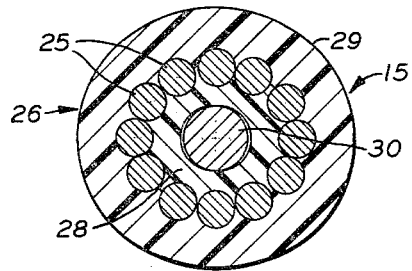

As is best shown in FIG. 5, when the screw driven plunger 19 is moved downwardly by actuation of the knob 22, the depressor 20 contacts the casing 26 medially the lateral span between the tines 12 and 13 of the split anvil 14. The tines 12 and 13 restrain the casing 26 at their points of contact and define the extent of the limited arc along which the cable casing 26 will bend as pressure is applied to the opposite side thereof by the depressor 20 through plunger 19. Moreover, the relatively short span between the spaced tines 12 and 13 of the split anvil 14 cooperates with the plunger 19 to force the casing 26 to bend about a very short radius. As the casing is thus bowed along this limited arc the geometric grouping of the casing wires 25 changes from cylindrical to elliptic—i.e., from the grouping shown in FIG. 6 to the grouping shown in FIG. 7. This change in wire grouping moves the inner tube 28 into frictional contact with the core 30. Thus, by controlled application of the pressure to the casing 26 by the screw driven plunger 19, one can select any desired frictional resistance to the reciprocable motion of the core 30, or even lock it entirely in any selected position without doing any damage to the wires 25 or the casing 26. It must be pointed out, however, that the depressor 20 must have sufficient contact area with the casing 26 so that the pressure applied thereby bends the casing 26 and does not in any way deform any of the individual wires 25 in the casing. This is imperative since the operation of the subject brake device depends entirely upon a bending of the casing about a short radius along a limited arc. It is only in this way that the efficient operation of the cable is immediately restored upon relieving the pressure applied by nose 20.

Of course, the outer cover 29, which is generally made of a plastic material, may itself deform slightly as pressure is applied by nose 20 to the casing 26, but the resiliency of the plastic cover 29 will permit it readily to regain its prestressed shape. A close observance of the cutaway portion of the cable in FIG. 5 shows that while the outer cover 29 may be slightly deformed immediately beneath nose 20, at 31 the individual wires 25 show a uniformity of bend and are accordingly undamaged.

It is therefore apparent that a brake 10 for a push-pull cable constructed according to the teaching of the present invention accomplishes the objects thereof.

What is claimed is:

1. A brake in combination with a push-pull control cable having a casing formed of wires laid in substantially side-by-side relation in a long pitched helix with a reciprocally slidable core member received therein, said brake comprising, an anvil having a split portion for supporting said cable casing thereacross, a plunger, depressor means actuated by said plunger, said plunger oriented transversely and medially of said split portion, a means selectively to drive said plunger toward and away from said split portion to engage said casing, whereby the wires of said casing are rearranged so that said casing frictionally engages the core member.

2. A brake in combination with a push-pull control cable having a casing formed of wires laid in substantially side-by-side relation in a long pitched helix with a reciprocally slidable core member received therein, said brake comprising, a pair of laterally spaced tines forming a split anvil for supporting said cable casing thereacross, a plunger, said plunger oriented transversely and medially of said tines in opposed spaced relation with respect thereto, and means selectively to drive said plunger toward and away from said split anvil medially of said tines into and out of contact with the casing of said cable, whereby the wires of said casing are rearranged so that said casing frictionally engages the core member.

3. A brake in combination with a push-pull control cable having a casing formed of wires laid in substantially side-by-side relation in a long pitched helix with a reciprocally slidable core member received therein, said brake comprising, a pair of laterally spaced hooked tines forming a split anvil adapted to retain said push-pull cable thereacross, a plunger, depressor means actuated by said plunger, said plunger oriented transversely and medially of said tines in opposed spaced relation with respect thereto, and means selectively to drive said plunger toward and away from said split anvil medially of said tines to move said depressor means into and out of contact with the casing of said cable, whereby the wires of said casing are rearranged so that said casing frictionally engages the core member.

4. A brake in combination with a push-pull control cable having a casing formed of wires laid in substantially side-by-side relation in a long pitched helix with a reciprocally slidable core member received therein, said brake comprising, a body portion, a pair of laterally spaced, hooked tines extending outwardly of said body portion to form a split anvil adapted to retain a push-pull cable casing thereacross, a support beam extending outwardly of said body portion in spaced relation to said tines and substantially parallel thereto, a threaded bore through said support beam, a plunger, said plunger having a threaded shank operatively received in said bore and oriented transversely and medially of said laterally spaced tines in spaced relation with respect thereto, a depressor means actuated by said plunger and positioned in opposition to said split anvil medially of said tines, and means to turn said plunger selectively to drive said depressor means toward and away from said split anvil into and out of contact with the casing of said cable, whereby the wires of said casing are rearranged so that said casing frictionally engages the core member.

(References on following page)

References Cited by the Examiner

UNITED STATES PATENTS

| | | | |
|---|---|---|---|
| 258,135 | 5/1882 | Schmucker | 188—67 |
| 1,815,631 | 7/1931 | Olson et al. | 74—531 X |
| 1,957,367 | 5/1934 | Suydam | 188—196 |
| 2,205,846 | 6/1940 | Courtney | 188—67 |
| 2,621,043 | 12/1952 | Olmstead | 188—67 X |
| 3,007,300 | 11/1961 | Peterson. | |

FOREIGN PATENTS 569,111  5/1945  Great Britain.

MILTON BUCHLER, *Primary Examiner.*

ARTHUR L. LA POINT, FERGUS S. MIDDLETON,
*Examiners.*

GEORGE E. A. HALVOSA, *Assistant Examiner.*

UNITED STATES PATENT OFFICE
CERTIFICATE OF CORRECTION

Patent No. 3,223,201                            December 14, 1965

Donald W. Waner

It is hereby certified that error appears in the above numbered patent requiring correction and that the said Letters Patent should read as corrected below.

Column 4, line 44, after "cable" insert -- casing --.

Signed and sealed this 1st day of August 1967.

(SEAL)
Attest:

EDWARD M. FLETCHER, JR.                     EDWARD J. BRENNER
Attesting Officer                                      Commissioner of Patents